(12) United States Patent
Dozen

(10) Patent No.: US 11,537,407 B2
(45) Date of Patent: Dec. 27, 2022

(54) ELECTRONIC EQUIPMENT PROVIDED WITH AN AI PROCESSOR

(71) Applicant: KYOCERA Document Solutions Inc., Osaka (JP)

(72) Inventor: Kazuki Dozen, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/358,158

(22) Filed: Jun. 25, 2021

(65) Prior Publication Data
US 2022/0004393 A1 Jan. 6, 2022

(30) Foreign Application Priority Data
Jul. 2, 2020 (JP) .............................. JP2020-114646

(51) Int. Cl.
*G06F 9/445* (2018.01)
*G06F 8/60* (2018.01)
*G06N 20/00* (2019.01)
*H04N 1/00* (2006.01)
*G06F 3/12* (2006.01)

(52) U.S. Cl.
CPC ............ *G06F 9/445* (2013.01); *G06F 3/1225* (2013.01); *G06F 8/60* (2013.01); *G06N 20/00* (2019.01); *H04N 1/00411* (2013.01)

(58) Field of Classification Search
CPC ....................................................... G06F 9/445
USPC ........................................................ 358/1.13
See application file for complete search history.

(56) References Cited

U.S. PATENT DOCUMENTS

2021/0245367 A1* 8/2021 Zweig .................. B25J 11/0005
2021/0349433 A1* 11/2021 Zweig ................ G05B 19/0423

FOREIGN PATENT DOCUMENTS

JP            2005-017516         1/2005

* cited by examiner

*Primary Examiner* — Jacky X Zheng
(74) *Attorney, Agent, or Firm* — Lex IP Meister, PLLC

(57) ABSTRACT

An image forming apparatus as electronic equipment includes an AI processor provided with a memory, a storage unit capable of storing a binary, which is a program for the AI processor, and an AI processor operation unit that operates the AI processor. The AI processor operation unit deploys, in the memory, the binary stored in the storage unit. The AI processor executes a function of the binary by loading the binary deployed in the memory. The binary is not included in firmware of the image forming apparatus.

5 Claims, 8 Drawing Sheets

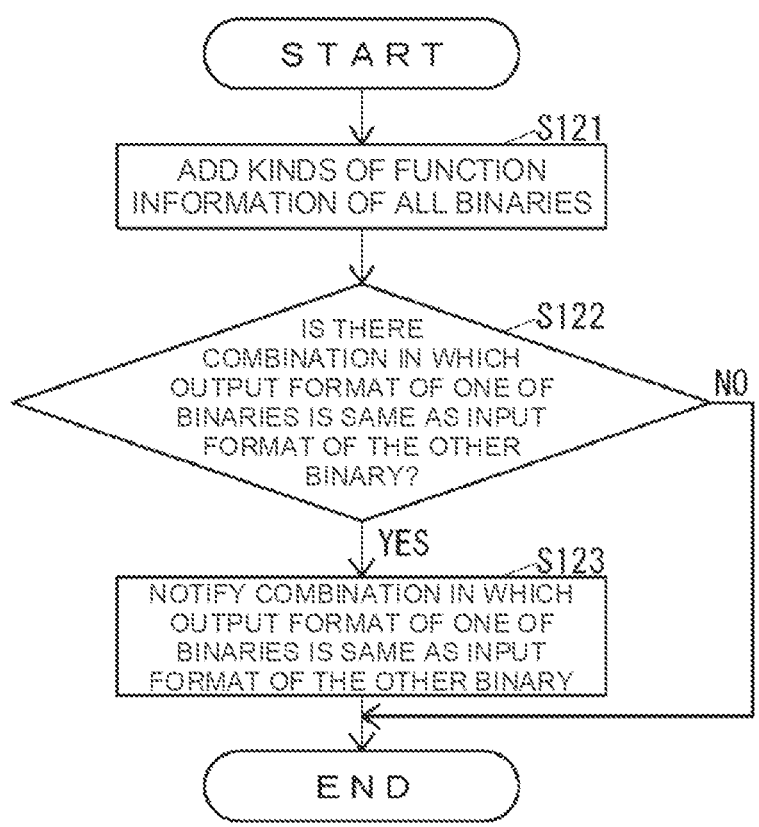

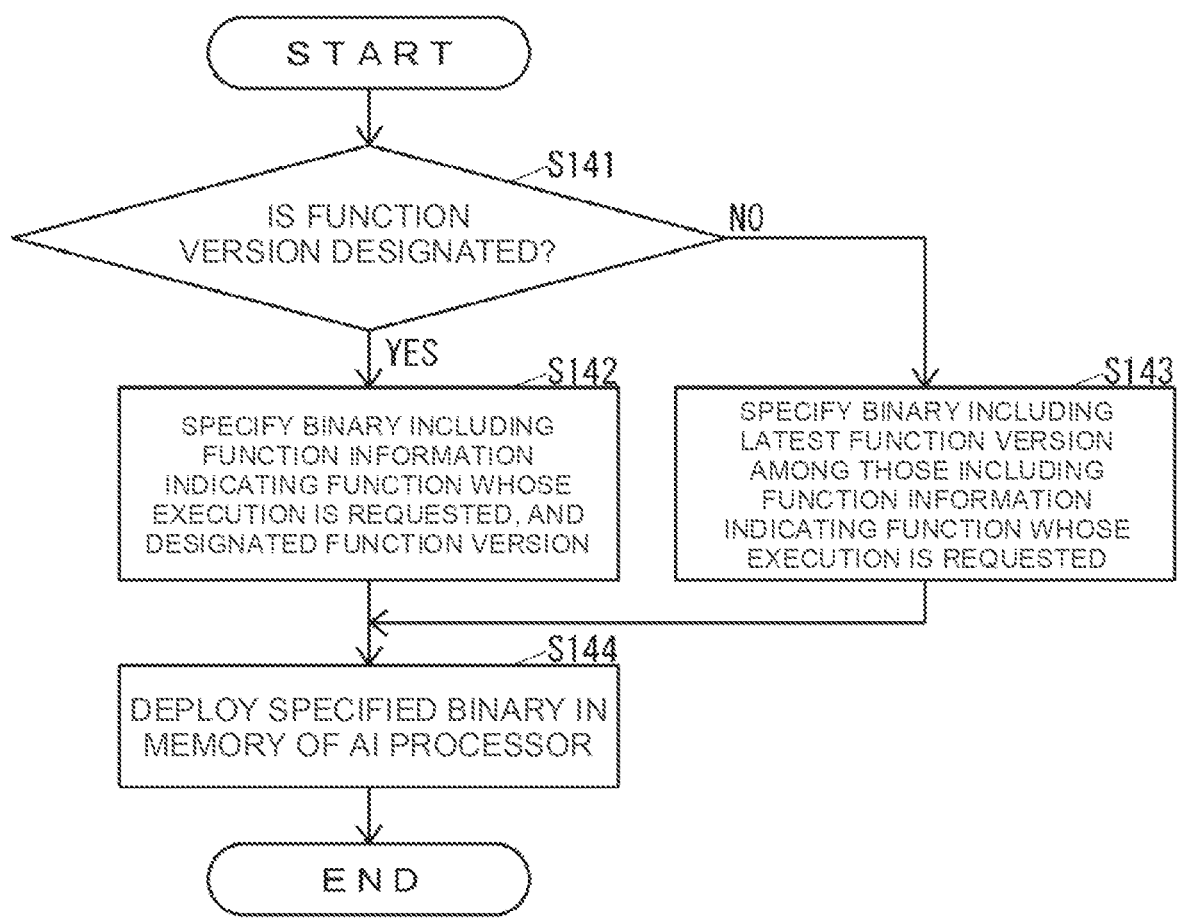

ELECTRONIC EQUIPMENT PROVIDED WITH AN AI PROCESSOR

INCORPORATION BY REFERENCE

This application is based upon, and claims the benefit of priority from, corresponding Japanese Patent Application No. 2020-114646 filed in the Japan Patent Office on Jul. 2, 2020, the entire contents of which are incorporated herein by reference.

BACKGROUND

Field of the Invention

The present disclosure relates to electronic equipment provided with an AI processor.

Description of Related Art

As typical electronic equipment, there is known electronic equipment in which, after a program is written in a non-volatile memory, the program is executed at a startup time of the electronic equipment.

SUMMARY

Electronic equipment according to the present disclosure is electronic equipment including an AI processor provided with a memory, a storage unit capable of storing a program for the AI processor, and an AI processor operation unit that operates the AI processor. The AI processor operation unit deploys, in the memory, the program stored in the storage unit. The AI processor executes a function of the program by loading the program deployed in the memory. The program is not included in firmware of the electronic equipment.

BRIEF DESCRIPTION OF THE DRAWINGS

FIG. 7 is a flowchart of an operation of the AI processor operation unit shown in FIG. 5, when the image forming apparatus is started; and FIG. 8 is a flowchart of an operation of the AI processor operation unit shown in FIG. 5, when execution of a function is requested from an AI processor control service.

DETAILED DESCRIPTION

In the following, an embodiment according to the present disclosure is described with reference to the drawings.

First, a configuration of an image forming apparatus as electronic equipment according to one embodiment of the present disclosure is described.

Figure 1:
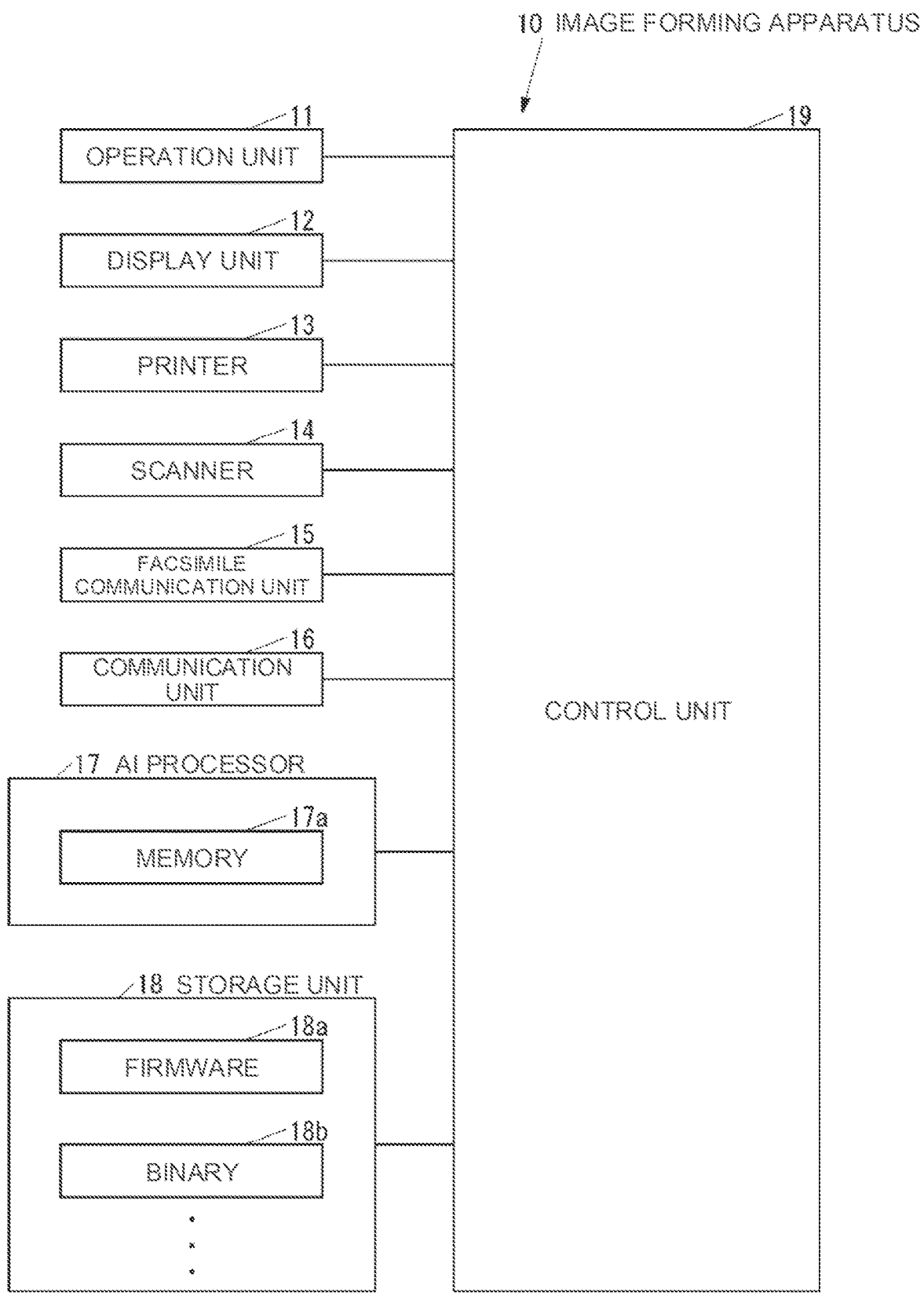
FIG. 1 is a block diagram of an image forming apparatus according to one embodiment of the present disclosure.

FIG. 1 is a block diagram of an image forming apparatus 10 according to the present embodiment.

As shown in FIG. 1, the image forming apparatus 10 is a multi function peripheral (MFP) device including: an operation unit 11, which is an operation device through which various operations are input such as, for example, a button; a display unit 12, which is a display device for displaying various pieces of information such as, for example, a liquid crystal display (LCD); a printer 13, which is a printing device for printing an image on a recording medium such as paper; a scanner 14, which is a reading device for reading an image from a document; a facsimile communication unit 15, which is a facsimile device for performing facsimile communication with an unillustrated external facsimile device via a communication line such as a public telephone line; a communication unit 16, which is a communication device for communicating with an external device via a network such as a local area network (LAN) or the Internet, or directly by wired or wireless communication without a network; an AI processor 17, as a processor for enabling inference processing of machine learning; a storage unit 18, which is a non-volatile storage device for storing various types of information such as, for example, a semiconductor memory or a hard disk drive (HDD); and a control unit 19 for controlling the entirety of the image forming apparatus 10.

The AI processor 17 includes a memory 17a in which a program for commanding processing to be executed by the AI processor 17 is deployed. Once the program is deployed in the memory 17a, the AI processor 17 executes processing commanded by the program.

The storage unit 18 is capable of storing firmware 18a. The firmware 18a may, for example, be installed in the image forming apparatus 10 at a manufacturing stage of the image forming apparatus 10, or may be additionally installed in the image forming apparatus 10 from an external storage medium such as a universal serial bus (USB) memory, an SD card, or the like, or may be additionally installed in the image forming apparatus 10 from a network.

The storage unit 18 is capable of storing a binary 18b, which is a program for the AI processor 17. The storage unit 18 is capable of storing at least one binary, which is a program for the AI processor 17, in addition to the binary 18b. The storage unit 18 is capable of storing a binary in a binary storage area (hereinafter, referred to as a "binary area"). A binary may, for example, be installed in the image forming apparatus 10 at a manufacturing stage of the image forming apparatus 10, or may be additionally installed in the image forming apparatus 10 from an external storage medium such as a USB memory, an SD card, or the like, or may be additionally installed in the image forming apparatus 10 from a network.

Figure 2:
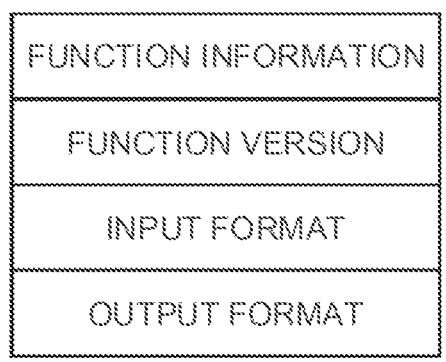
FIG. 2 is a diagram showing one example of information included in a binary shown in FIG. 1.

FIG. 2 is a diagram showing one example of information included in the binary 18b shown in FIG. 1.

As shown in FIG. 2, the binary 18b includes function information indicating a function that can be achieved by causing the AI processor 17 to load the binary 18b, a function version indicating a version of a function of the binary 18b, an input format of data to the binary 18b, and an output format of data from the binary 18b.

The function indicated by the function information includes, for example, a function of converting monochrome image data into color image data, and a function of making image quality clearer.

As the input format and the output format, for example, there is an image in a JPEG format of 125×125 dpi.

The control unit 19 shown in FIG. 1 includes, for example, a central processing unit CPU), a read only memory (RAM) storing a program and various types of data, and a random access memory (RAM) as a memory for use as a work area of the CPU of the control unit 19. The CPU of the control unit 19 executes a program stored in the storage unit 18 or in the ROM of the control unit 19.

Figure 3:
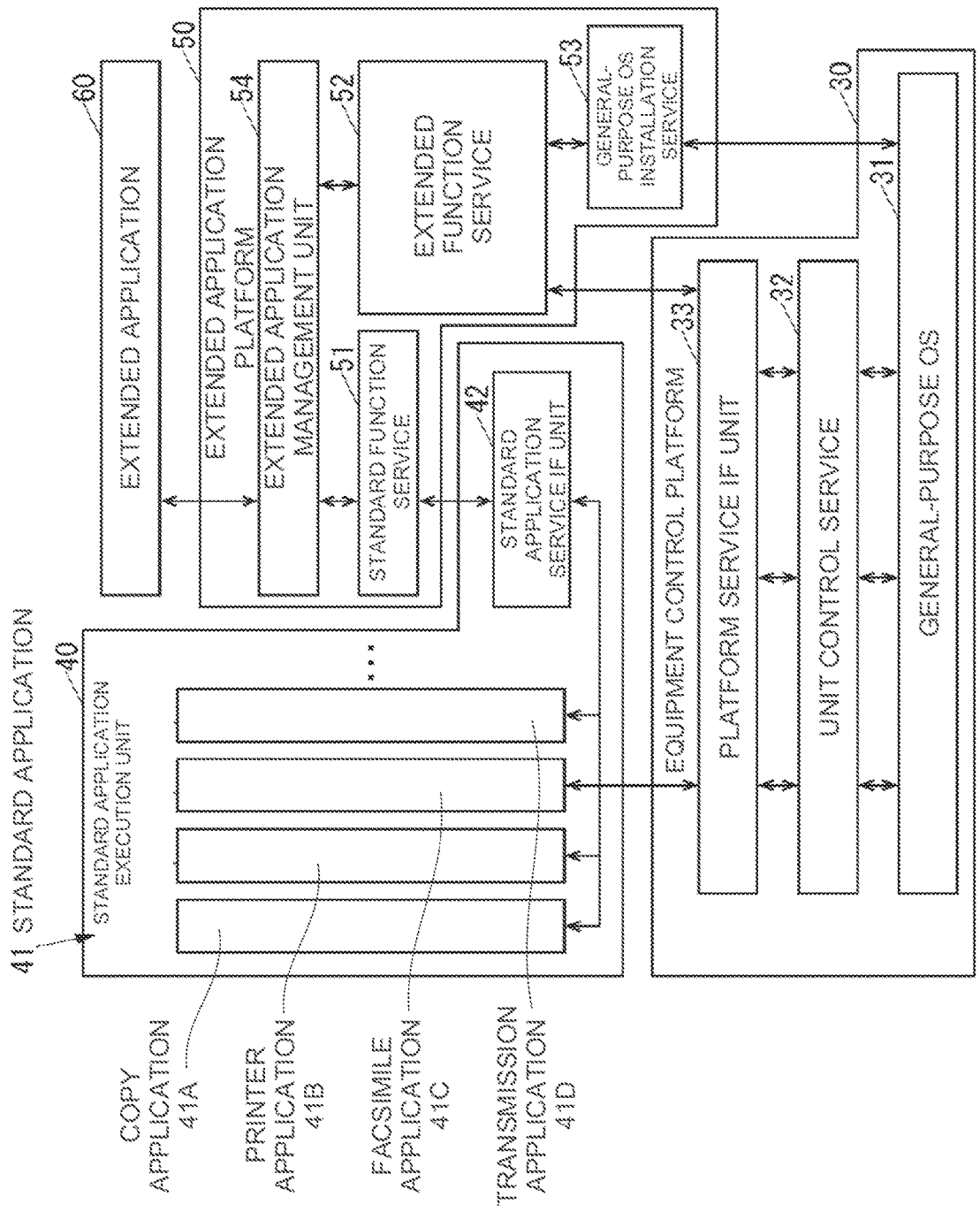
FIG. 3 is a block diagram showing a control configuration of the image forming apparatus shown in FIG. 1.

FIG. 3 is a block diagram showing a control configuration of the image forming apparatus 10.

The control unit 19 achieves the control configuration shown in FIG. 3 by executing a program stored in the storage unit 18 or in the ROM of the control unit 19.

As shown in FIG. 3, the control configuration of the image forming apparatus 10 includes an equipment control platform 30 that manages hardware of each unit of the image forming apparatus 10 such as, for example, the operation unit 11, the display unit 12, the printer 13, the scanner 14, the facsimile communication unit 15, and the communication unit 16, and controls the hardware in a function unit; a standard application execution unit 40 that executes a standard application 41, which is an application program for executing various types of standard processing of the image forming apparatus 10; and an extended application platform 50 that executes an extended application 60, which is an application program for executing various types of processing that cannot be executed only by the standard application 41. The standard application execution unit 40 and the extended application platform 50 are respectively operated on the equipment control platform 30.

The equipment control platform 30 includes a general-purpose operating system (OS) 31 such as, for example, Linux (registered trademark); a unit control service 32 that controls hardware of each unit of the image forming apparatus 10 associated with a function of the image forming apparatus 10 in an appropriate manner; and a platform service IF unit 33 that provides an interface for using hardware from outside the equipment control platform 30. The control unit 19 achieves the equipment control platform 30 by executing the firmware 18a.

The standard application execution unit 40 includes the standard application 41, and a standard application service IF unit 42 that provides an interface for using a function of the standard application 41 from outside the standard application execution unit 40.

For example, as the standard application 41, there are a copy application 41A that prints an image read from a document by the scanner 14 by means of the printer 13 in response to an instruction via the operation unit 11; a printer application 41B that performs printing by the printer 13, based on data input via the communication unit 16 or data stored in the storage unit 18; a facsimile application 41C that facsimile-transmits, by the facsimile communication unit 15, an image read from a document by the scanner 14 in response to an instruction via the operation unit 11, or an image based on data input via the communication unit 16, or performs printing of an image that is facsimile-received by the facsimile communication unit 15 by means of the printer 13 or performs storage into the storage unit 18; and a transmission application 41D that transmits data via the communication unit 16.

The standard application service IF unit 42 may provide a different interface for each standard application 41. The standard application service IF unit 42 can perform execution, installation, setting change, deletion and the like of the standard application 41.

The extended application platform 50 includes a standard function service 51 that causes the standard application 41 to execute a function via the standard application service IF unit 42, an extended function service 52 that causes hardware of each unit of the image forming apparatus 10 to execute a function via the platform service IF unit 33, a general-purpose OS installation service 53 for adding a function to the general-purpose OS 31, and an extended application management unit 54 that manages installation, activation, execution, execution termination, uninstallation, and the like of the extended application 60 by means of an API of the extended application platform 50.

The extended application 60 can use a function of the standard application 41 by calling the standard function service 51, use a function of hardware of each unit of the image forming apparatus 10 by calling the extended function service 52, and add a function to the general-purpose OS 31 by calling the general-purpose OS installation service 53. For example, as the extended application 60, there are practical applications such as optical character recognition (OCR), a surveillance camera application, watermark creation, invoice creation, employee list management, slip management, contract management, business card management, PDF creation, ledger management, and group management; and management applications such as an installer application that performs addition and/or change of a device driver, firmware, and the like on the general-purpose OS 31.

Figure 4:
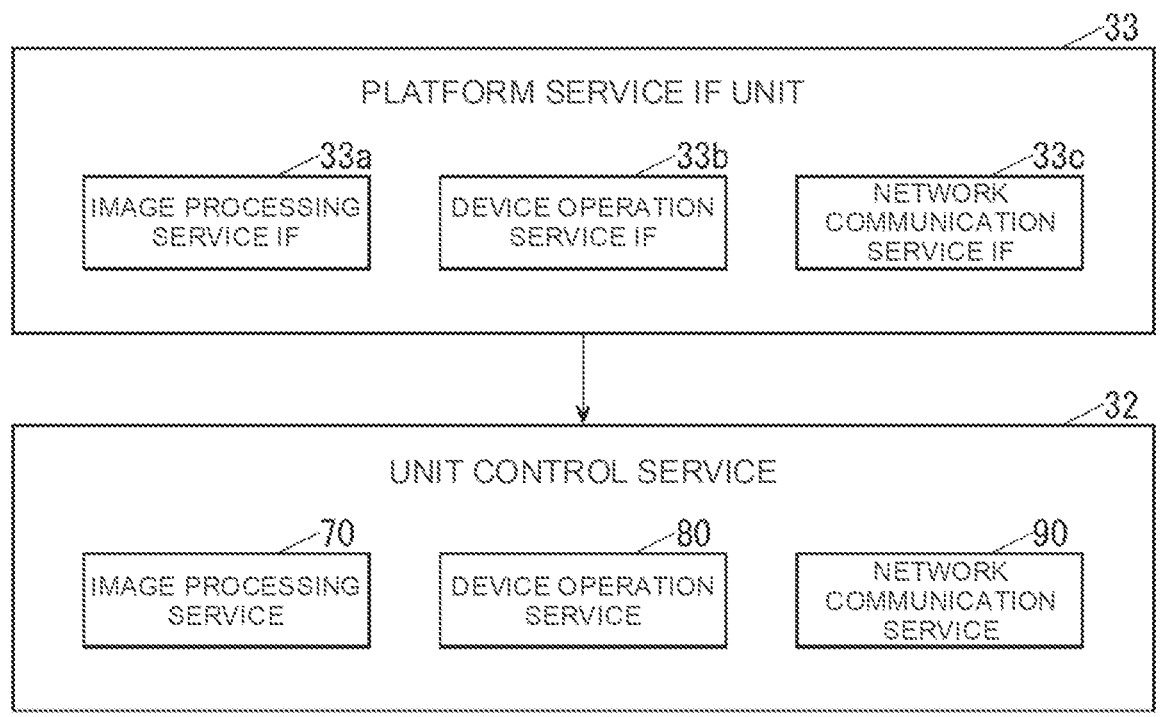
FIG. 4 is a block diagram showing a detailed configuration of a unit control service and a platform service IF unit shown in FIG. 3.

FIG. 4 is a block diagram showing a detailed configuration of the unit control service 32 and the platform service IF unit 33.

As shown in FIG. 4, the unit control service 32 includes an image processing service 70 that provides a service related to creation, conversion, or output of image processing data, such as drawing image data to be printed by the printer 13; a device operation service 80 that provides a service for controlling hardware i.e., a device of each unit of the image forming apparatus 10; and a network communication service 90 that provides a service related to network transmission and reception.

The platform service IF unit 33 includes an image processing service IF 33a as an interface associated with a function of the equipment control platform 30 related to creation, conversion, or output of image processing data; a device operation service IF 33b as an interface associated with a function of the equipment control platform 30 for controlling a device of the image forming apparatus 10; and a network communication service IF 33c as an interface associated with a function of the equipment control platform 30 related to network transmission and reception. The device operation service IF 33b constitutes a display content control unit that controls display content on the display unit 12.

Note that, the image processing service IF 33a, the device operation service IF 33b, and the network communication service IF 33c of the platform service IF unit 33 are respectively configured to call the image processing service 70, the device operation service 80, and the network communication service 90 of the unit control service 32 independently of one another without cooperation. For example, for a job of the copy application 41A, the image processing service IF 33a calls the image processing service 70 and the device operation service 80. Therefore, when a change occurs in any of the functions of the standard application 41, it is possible to cope with the change only by changing a service related to this function among the image processing service IF 33a, the device operation service IF 33b, and the network communication service IF 33c.

Figure 5:
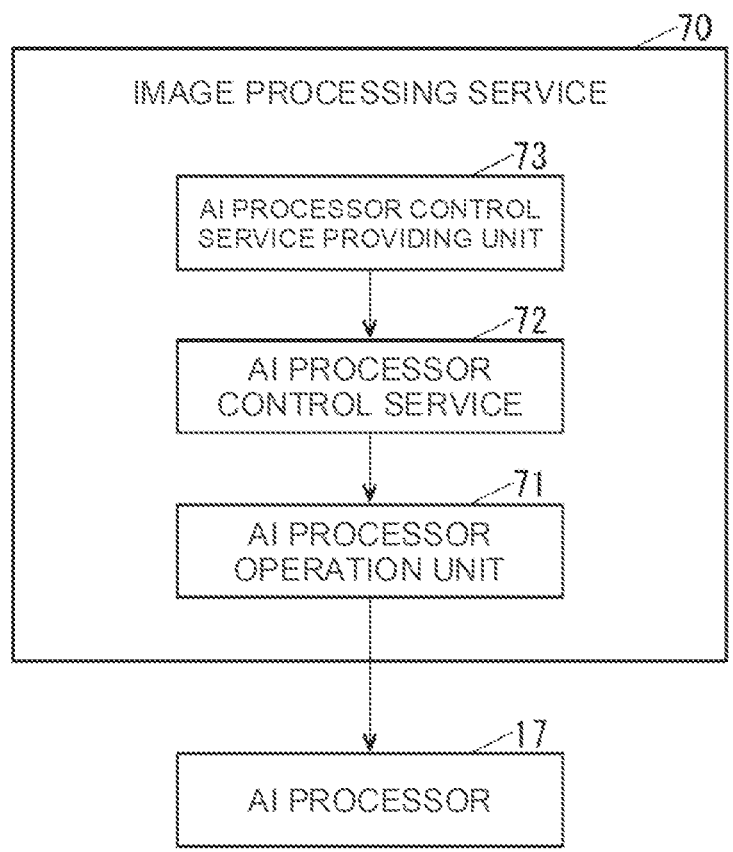
FIG. 5 is a block diagram showing a detailed configuration of an image processing service shown in FIG. 4.

FIG. 5 is a block diagram showing a detailed configuration of the image processing service 70.

As shown in FIG. 5, the image processing service 70 includes an AI processor operation unit 71, which is a driver for operating the AI processor 17, an AI processor control service 72 that controls the AI processor 17 via the AI processor operation unit 71, and an AI processor control service providing unit 73 as an interface for calling the AI processor control service 72 from outside the image processing service 70. The AI processor control service 72 can control the AI processor 17 only through an interface provided from the AI processor operation unit 71.

The image processing service 70 can execute AI processing with respect to an image read by the scanner 14, for example, by using the AI processor 17. For example, the image processing service 70 can clarify a line that become blurred when an image is enlarged by means of AI processing, and extract handwritten characters included in an image by means of AI processing.

Next, an operation of the image forming apparatus 10 is described.

First, an operation of the AI processor operation unit 71 when a binary is written in a binary area of the storage unit 18 is described.

Figure 6:
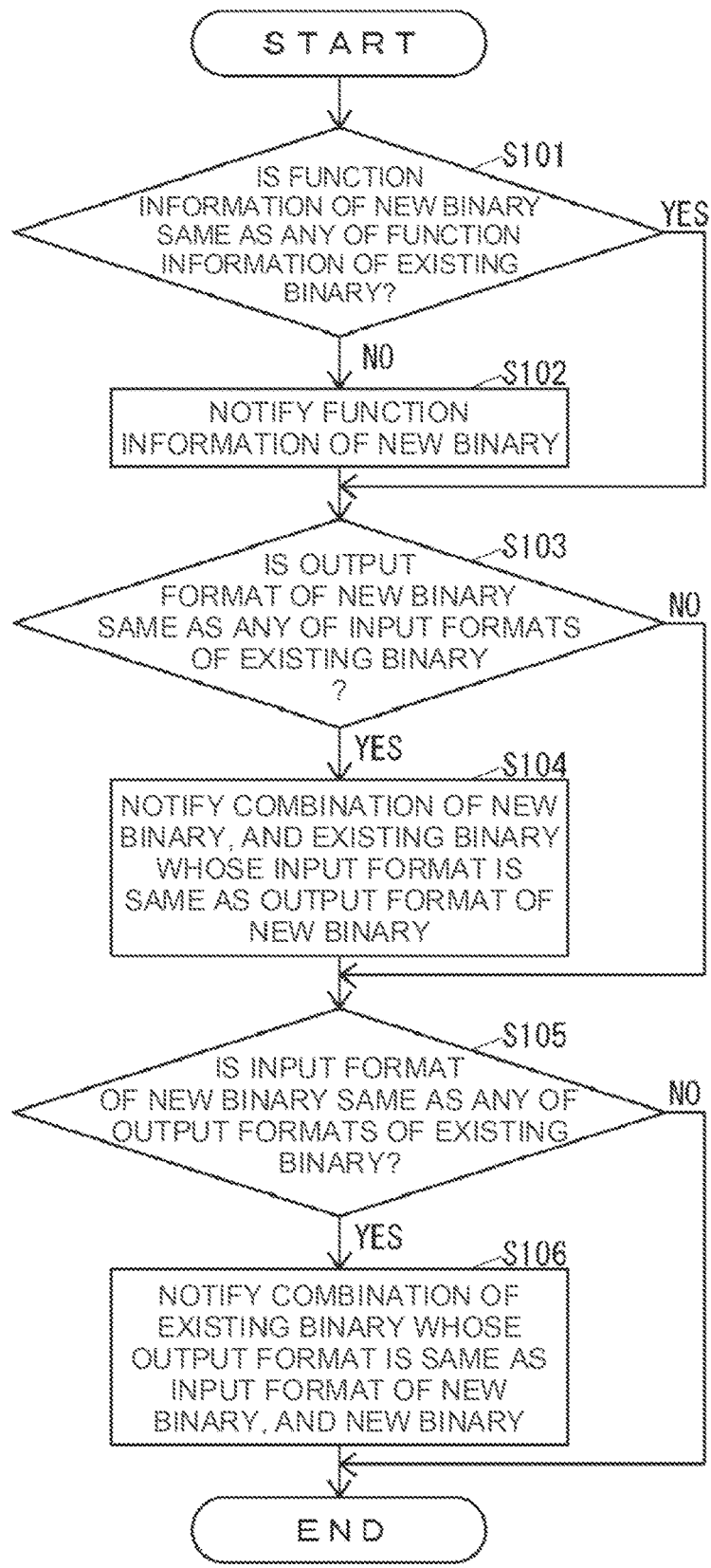
FIG. 6 is a flowchart of an operation of an AI processor operation unit shown in FIG. 5, when a binary is written in a binary area of a storage unit.

FIG. 6 is a flowchart of an operation of the AI processor operation unit 71 when a binary is written in a binary area of the storage unit 18.

As shown in FIG. 6, the AI processor operation unit 71 determines whether function information of a binary (hereinafter, referred to as a "new binary") written in a binary area of the storage unit 18 is the same as any of function information of a binary (hereinafter, referred to as an "existing binary") already stored in the binary area of the storage unit 18 (S101).

When the AI processor operation unit 71 determines in S101 that the function information of the new binary is not the same as any of the function information of the existing binary, the AI processor operation unit 71 notifies the device operation service IF 33*b* of the function information of the new binary (S102). Therefore, the device operation service IF 33*b* causes the display unit 12 to display an instruction accept portion such as, for example, a button that accepts an instruction to execute the function indicated by the function information notified in S102 via the device operation service 80 and the general-purpose OS 31 in this order.

When the AI processor operation unit 71 determines in S101 that the function information of the new binary is the same as any of the function information of the existing binary, or when processing of S102 is terminated, the AI processor operation unit 71 determines whether an output format of the new binary is the same as any of input formats of the existing binary (S103).

When the AI processor operation unit 71 determines in S103 that the output format of the new binary is the same as any of the input formats of the existing binary, the AI processor operation unit 71 notifies the device operation service IF 33*b* of a combination of the new binary, and the existing binary whose input format is the same as the output format of the new binary (S104). Specifically, after a new binary is executed, the AI processor operation unit 71 notifies the device operation service IF 33*b* that an existing binary whose input format is the same as the output format of the new binary can be executed with respect to data output from the new binary. Therefore, the device operation service IF 33*b* causes the display unit 12 to display an instruction accept portion such as, for example, a button that accepts an instruction to execute in such a way that functions of the combination notified in S104 are used together via the device operation service 80 and the general-purpose OS 31 in this order.

When the AI processor operation unit 71 determines in S103 that the output format of the new binary is not the same as any of the input formats of the existing binary, or after processing of S104 is terminated, the AI processor operation unit 71 determines whether the input format of the new binary is the same as any of the output formats of the existing binary (S105).

When the AI processor operation unit 71 determines in S105 that the input format of the new binary is the same as any of the output formats of the existing binary, the AI processor operation unit 71 notifies the device operation service IF 33*b* of a combination of the existing binary whose output format is the same as the input format of the new binary, and the new binary (S106). Specifically, the AI processor operation unit 71 notifies the device operation service IF 33*b* that, after execution of an existing binary whose output format is the same as an input format of a new binary, the new binary can be executed with respect to data output from the existing binary. Therefore, the device operation service IF 33*b* causes the display unit 12 to display an instruction accept portion such as, for example, a button that accepts an instruction to execute in such a way that functions of the combination notified in S106 are used together via the device operation service 80 and the general-purpose OS 31 in this order.

When the AI processor operation unit 71 determines in S105 that the input format of the new binary is not the same as any of the output formats of the existing binary, or when processing of S106 is terminated, the operation shown in FIG. 6 is terminated.

In the foregoing, an operation of the AI processor operation unit 71 when a binary is written in a binary area of the storage unit 18 is described. However, when the image forming apparatus 10 is started, the AI processor operation unit 71 is operated as shown in FIG. 7.

FIG. 7 is a flowchart of an operation of the AI processor operation unit 71 when the image forming apparatus 10 is started.

As shown in FIG. 7, the AI processor operation unit 71 notifies the device operation service IF 33*b* of kinds of function information of all binaries stored in a binary area of the storage unit 18 (S121). Specifically, when there are a plurality of binaries whose function information is the same, the AI processor operation unit 71 notifies the device operation service IF 33*b* of only one piece of function information, as function information of these binaries. Therefore, the device operation service IF 33*b* causes the display unit 12 to display an instruction accept portion such as, for example, a button that accepts an instruction to execute a function indicated by function information notified in S121 via the device operation service 80 and the general-purpose OS 31 in this order.

After processing of S121 is terminated, the AI processor operation unit 71 determines whether there is a combination, among binaries stored in the binary area of the storage unit 18, in which an output format of one of the binaries is the same as an input format of the other binary (S122).

When the AI processor operation unit 71 determines in S122 that there is a combination in which an output format of one of the binaries is the same as an input format of the other binary, the AI processor operation unit 71 notifies the device operation service IF 33*b* of the combination in which the output format of one of the binaries is the same as the input format of the other binary (S123). Specifically, after one of the binaries is executed, the AI processor operation unit 71 notifies the device operation service IF 33*b* that the other binary can be executed with respect to data output from the one binary. Therefore, the device operation service IF 33*b* causes the display unit 12 to display an instruction accept portion such as, for example, a button that accepts an instruction to execute in such a way that functions of the combination notified in S123 are used together via the device operation service 80 and the general-purpose OS 31 in this order.

When the AI processor operation unit 71 determines in S122 that there is no combination in which an output format of one of the binaries is the same as an input format of the other binary, or when processing of S123 is terminated, the operation shown in FIG. 7 is terminated.

Note that, when there are a plurality of function versions having a same function in a binary stored in the binary area of the storage unit 18, the device operation service IF 33*b* causes the display unit 12 to display an instruction accept portion that can accept designation of a function version, as an instruction accept portion that accepts an instruction to execute the function.

Next, an operation of the AI processor operation unit 71 when execution of a function is requested from the AI processor control service 72 is described.

FIG. 8 is a flowchart of an operation of the AI processor operation unit 71 when execution of a function is requested from the AI processor control service 72.

When a user operates an instruction accept portion displayed on the display unit 12 via the operation unit 11, the AI processor control service 72 requests the AI processor operation unit 71 to execute a function associated with the operated instruction accept portion.

As shown in FIG. 8, when the AI processor operation unit 71 is requested to execute a function from the AI processor control service 72, the AI processor operation unit 71 determines whether a function version of the function is designated (S141).

When the AI processor operation unit 71 determines in S141 that a function version of a function whose execution is requested from the AI processor control service 72 is designated, the AI processor operation unit 71 specifies a binary, from among the binaries stored in the binary area of the storage unit 18, which includes function information indicating the function whose execution is requested from the AI processor control service 72, and the function version determined to be designated in S141 (S142).

When the AI processor operation unit 71 determines in S141 that a function version of a function whose execution is requested from the AI processor control service 72 is not designated, the AI processor operation unit 71 specifies a binary, from among the binaries stored in the binary area of the storage unit 18, which includes a latest function version among those including function information indicating a function whose execution is requested from the AI processor control service 72 (S143).

After processing of S142 or S143, the AI processor operation unit 71 deploys, in the memory 17*a* of the AI processor 17, the binary specified in S142 or S143 (S144), and terminates the operation shown in FIG. 8. Therefore, the AI processor 17 executes the function of the binary by loading the binary deployed in the memory 17*a*.

As described above, since a binary, which is a program for the AI processor 17, is not included in the firmware 18*a* of the image forming apparatus 10, the image forming apparatus 10 can update a function to be executed by the AI processor 17, even if the firmware 18*a* is not updated.

Herein, a power supply of the image forming apparatus 10 is needed to be turned off and then turned on again when the firmware 18*a* is updated. However, since the image forming apparatus 10 can update a function to be executed by the AI processor 17, even if the firmware 18*a* is not updated, the image forming apparatus 10 can update the function to be executed by the AI processor 17 even without turning off the power supply of the image forming apparatus 10 and then turning on again. Therefore, the image forming apparatus 10 can reduce a period of time during which a user cannot use the image forming apparatus 10.

Since the image forming apparatus 10 can update a function to be executed by the AI processor 17 even without turning off the power supply of the image forming apparatus 10 and then turning on again, the image forming apparatus 10 can update the function to be executed by the AI processor 17 without stopping the function to be executed by the AI processor 17.

Since the image forming apparatus 10 can update the function to be executed by the AI processor 17 without updating the firmware 18*a*, the image forming apparatus 10 does not have to create the firmware 18*a* for updating the function to be executed by the AI processor 17. Specifically, the image forming apparatus 10 can facilitate updating of a function to be executed by the AI processor 17.

Since the image forming apparatus 10 causes the display unit 12 to display an instruction accept portion that accepts an instruction to execute a function indicated by function information of a binary, which is a program for the AI processor 17, even if the firmware 18*a* of the image forming apparatus 10 is not updated, it is possible to display, on the display unit 12, the instruction accept portion for causing the AI processor 17 to execute the function.

Since the image forming apparatus 10 causes the display unit 12 to display an instruction accept portion that can accept designation of a function version, the image forming apparatus 10 allows the AI processor 17 to execute a function of a function version desired by a user regarding a specific function.

Since the image forming apparatus 10 causes the display unit 12 to display that functions of a combination in which an output format of one of binaries is the same as an input format of the other binary can be used together, convenience can be improved. Note that, the image forming apparatus 10 may cause the display unit 12 to display that functions of a combination can be used together according to a method other than a method according to which the display unit 12 is caused to display an instruction accept portion that accepts an instruction to execute in such a way that functions of a combination in which an output format of one of binaries is the same as an input format of the other binary are used together. For example, the image forming apparatus 10 may simply cause the display unit 12 to display that functions of a combination in which an output format of one of binaries is the same as an input format of the other binary can be used together.

In the present embodiment, the AI processor 17 is used in the image processing service 70. Alternatively, the AI processor 17 may be used in a service other than the image processing service 70. For example, the AI processor 17 may be used in the device operation service 80 or the network communication service 90.

Although the electronic equipment according to the present disclosure is an MFP device in the present embodiment, the electronic equipment may be an image forming apparatus other than an MFP device, such as a printer-dedicated machine, a scanner-dedicated machine, a facsimile-dedicated machine, or a copy machine, or may be electronic equipment other than an image forming apparatus, such as, for example, a personal computer (PC).

What is claimed is:

1. Electronic equipment comprising:
   an AI processor provided with a memory;
   a storage unit that stores firmware of the electronic equipment and a program for the AI processor, the program for the AI processor being stored in a specific storage area and being not included in firmware of the electronic equipment; and
   an AI processor operation unit that operates the AI processor, wherein
   the AI processor operation unit deploys the program stored in the specific storage area of the storage unit into the memory of the AI processor,
   the AI processor loads the program for the AI processor from the memory of the AI processor, to execute a process instructed by the program loaded.

2. The electronic equipment according to claim 1, further comprising:
   a display unit; and
   a display content control unit that controls display content on the display unit, wherein
   the program stored in the specific storage area of the storage unit includes function information indicating a function that can be achieved by executing the process instructed by the program loaded,
   the AI processor operation unit notifies the display content control unit of function information of the program stored in the specific storage area of the storage unit, and
   the display content control unit causes the display unit to display an instruction accept portion that accepts an instruction to execute a function indicated by the function information notified from the AI processor operation unit.

3. The electronic equipment according to claim 2, wherein
   the program stored in the specific storage area of the storage unit includes a function version indicating a version of a function of the program, and
   the display content control unit causes the display unit to display the instruction accept portion capable of accepting designation of a function version, when a plurality of the programs in which functions are same and function versions are different from one another are stored in the specific storage area of the storage unit.

4. The electronic equipment according to claim 2, wherein
   the program stored in the specific storage area of the storage unit includes an input format of data to the program, and an output format of data from the program,
   when a combination of two of the programs in which an output format of one of the programs is the same as an input format of the other program is stored in the specific storage area of the storage unit, the AI processor operation unit notifies the display content control unit of the combination, and
   the display content control unit causes the display unit to display that functions of a combination notified from the AI processor operation unit can be used together.

5. Electronic equipment comprising:
   an AI processor provided with a memory;
   a storage unit capable of storing a program for the AI processor;
   an AI processor operation unit that operates the AI processor;
   a display unit; and
   a display content control unit that controls display content on the display unit, wherein
   the AI processor operation unit deploys the program stored in the storage unit into the memory of the AI processor,
   the AI processor loads the program for the AI processor from the memory of the AI processor, to execute a process instructed by the program loaded,
   the program is not included in firmware of the electronic equipment,
   the program stored in the storage unit includes function information indicating a function that can be achieved by causing the AI processor to execute the process instructed by the program loaded,
   the AI processor operation unit notifies the display content control unit of function information of the program stored in the storage unit,
   the display content control unit causes the display unit to display an instruction accept portion that accepts an instruction to execute a function indicated by the function information notified from the AI processor operation unit,
   the program stored in the storage unit includes a function version indicating a version of the function of the program, and
   the display content control unit causes the display unit to display the instruction accept portion capable of accepting designation of a function version, when a plurality of the programs in which functions are same and function versions are different from one another are stored in the storage unit.

* * * * *